(12) United States Patent
Scofield

(10) Patent No.: US 11,607,725 B2
(45) Date of Patent: Mar. 21, 2023

(54) SIPHON DELIVERY METHOD FOR CONSISTENT MELT INFILTRATION

(71) Applicant: Rolls-Royce North American Technologies Inc., Indianapolis, IN (US)

(72) Inventor: Gregory David Scofield, Indianapolis, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 237 days.

(21) Appl. No.: 16/953,834

(22) Filed: Nov. 20, 2020

(65) Prior Publication Data

US 2021/0213521 A1 Jul. 15, 2021

Related U.S. Application Data

(60) Provisional application No. 62/961,412, filed on Jan. 15, 2020.

(51) Int. Cl.
| | | |
|---|---|---|
| *B22D 39/02* | (2006.01) | |
| *B22D 17/30* | (2006.01) | |
| *B22D 19/14* | (2006.01) | |
| *C04B 41/45* | (2006.01) | |
| *C04B 41/51* | (2006.01) | |
| *C04B 35/80* | (2006.01) | |

(52) U.S. Cl.
CPC .............. *B22D 39/02* (2013.01); *B22D 17/30* (2013.01); *B22D 19/14* (2013.01); *C04B 35/80* (2013.01); *C04B 41/457* (2013.01); *C04B 41/515* (2013.01); *C04B 2235/616* (2013.01)

(58) Field of Classification Search
CPC ........ B22D 39/00; B22D 39/02; B22D 39/06; B22D 17/30; B22D 19/14
See application file for complete search history.

(56) References Cited

U.S. PATENT DOCUMENTS

| 1,684,994 | A | * | 9/1928 | Jorgen-Jensen | ....... B22D 18/04 |
| | | | | | 164/306 |
| 8,851,152 | B2 | | 10/2014 | Frasier et al. | |
| 2013/0167374 | A1 | | 7/2013 | Kirby et al. | |
| 2016/0083305 | A1 | * | 3/2016 | Goetz | ................... C04B 35/657 |
| | | | | | 501/88 |

FOREIGN PATENT DOCUMENTS

EP 1 683 771 B1 8/2008

* cited by examiner

*Primary Examiner* — Kevin P Kerns
*Assistant Examiner* — Steven S Ha
(74) *Attorney, Agent, or Firm* — Crowell & Moring LLP

(57) ABSTRACT

A method for delivering a flowable material into a mold or to infiltrate a preformed component, a fiber preform, or a green body includes: providing a crucible having a body configured as a reservoir to hold the flowable material; adding a metal, a metal alloy, or combination thereof into the body of the crucible, the metal or metal alloy having a predetermined melting point; heating the crucible with the metal or metal alloy contained therein to a temperature that is at or above the melting point of the metal or metal alloy; allowing the metal or metal alloy to melt to form the flowable material; and creating a siphon such that the molten metal or metal alloy flows from the body of the crucible to infiltrate the preformed component or to fill the mold.

20 Claims, 4 Drawing Sheets

SIPHON DELIVERY METHOD FOR CONSISTENT MELT INFILTRATION

RELATED APPLICATION

The present patent document claims the benefit of priority under 35 U.S.C. 119(e) to U.S. Provisional Patent Application 62/961,412, which was filed on Jan. 15, 2020, and which is hereby incorporated by reference in its entirety.

TECHNICAL FIELD

This disclosure relates generally to the preparation of a ceramic matrix composite and more particularly, to a method of infiltrating a ceramic fiber preform.

BACKGROUND

The statements in this section merely provide background information related to the present disclosure and may not constitute prior art.

Ceramic matrix composites (CMCs), which include ceramic fibers embedded in a ceramic matrix, exhibit a combination of properties that make them promising candidates for industrial and aerospace applications, such as gas turbine engine components, which demand excellent thermal and mechanical properties along with low weight. Typically, one of the final steps in the fabrication of a ceramic matrix composite is melt infiltration, in which a molten material is infiltrated into a porous preformed component that includes the ceramic fibers. The melt infiltration process may be time consuming in the case of large components or parts having a complex geometry.

Melt infiltration may be accomplished using either static infiltration or dynamic infiltration. In static infiltration, a metal or metal alloy may be placed on top of the ceramic fiber preform and melted whereby gravity and capillary forces act to infiltrate the preform with the molten metal or metal alloy. Another variant of static infiltration includes the use of a wick to pull liquid metal or alloy upwards from below the preform and ultimately into the preform via capillary forces. Static infiltration may also be carried out from a horizontal direction in a similar fashion. In dynamic infiltration, a porous preform is slowly lowered into a crucible of a liquid metal or metal alloy (i.e., a molten bath or reservoir) such that capillary action fills the fiber preform with the liquid metal or metal alloy. In both of these cases, the generation of excessive waste material occurs or the need to implement additional process steps to recycle the unused metal or alloy is necessary.

The melt infiltration process may also lead to the excessive use of finishing operations in order to remove defects that are formed during the process due to the expansion of the metal or alloy that infiltrates the ceramic fiber preform. For example, silicon may expand during solidification by about 11%. In this case, the silicon expansion during cooling in a melt infiltration process promotes "nodules" to form if there is not sufficient free space inside the part. The silicon then finds the path of least resistance prior to fully solidifying, which often results in a silicon-rich protrusion on the surface of the part. Alternatively, when the free expansion of the silicon is constrained, a state of residual stress may be created.

BRIEF DESCRIPTION OF THE DRAWINGS

In order that the disclosure may be well understood, there will now be described various forms thereof, given by way of example, reference being made to the accompanying drawings, in which.

Figure 1:
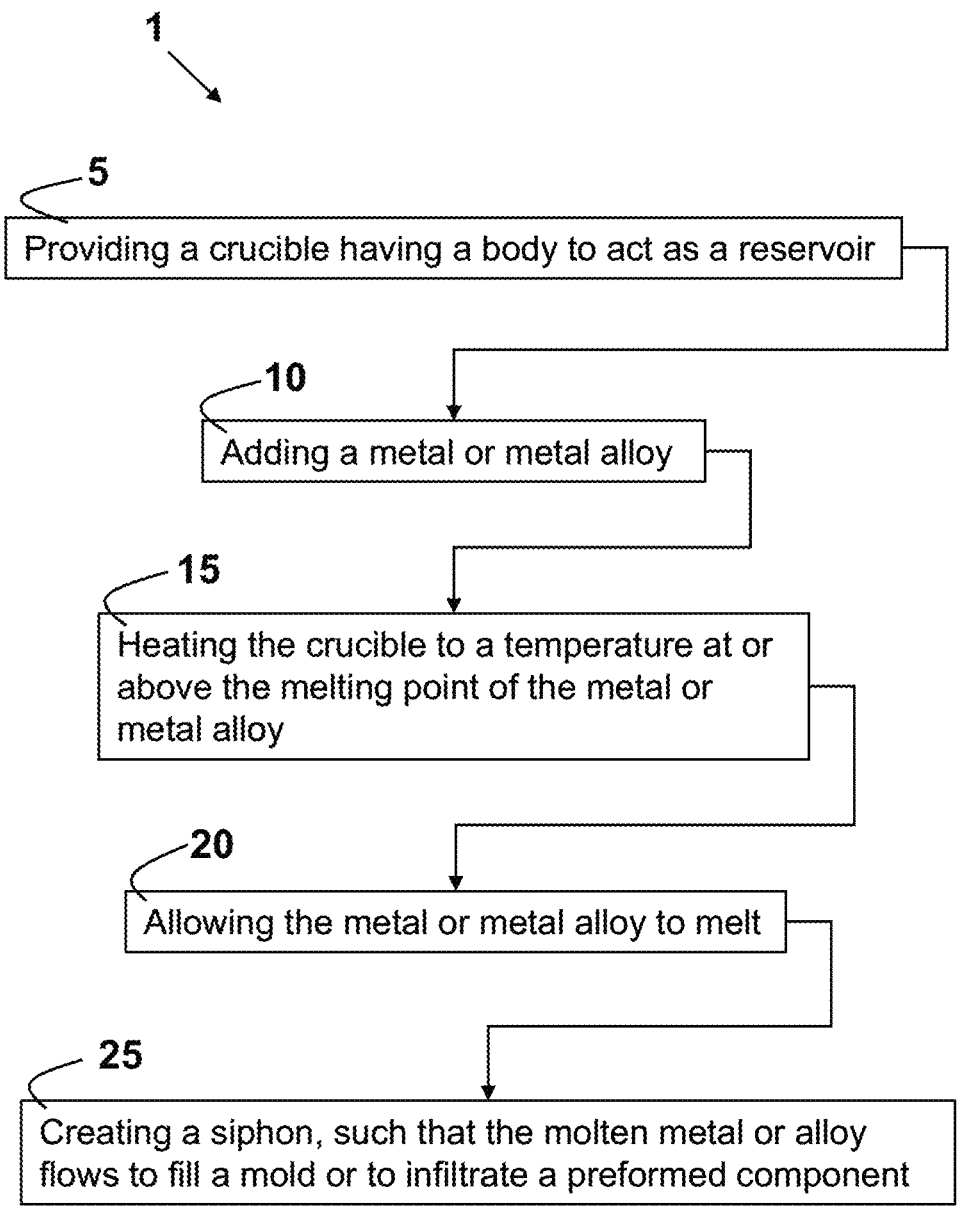
FIG. 1 is a flow chart of a process of delivering a flowable material to a preformed component or to fill a mold according to the teachings of the present disclosure.
Figure 2A:
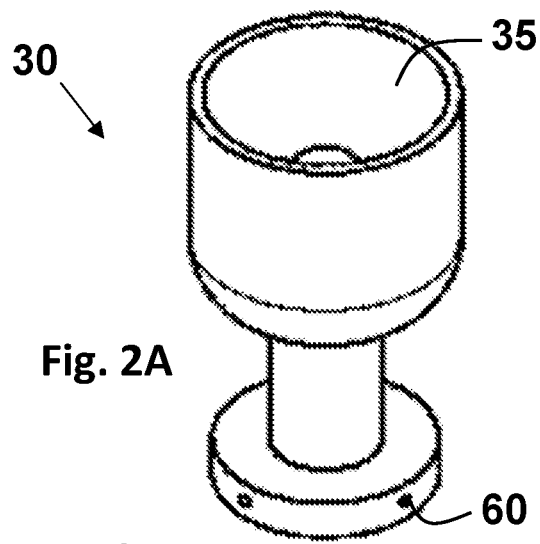
FIG. 2A is a top-down orthographic view of a siphon delivery crucible that may be used in the methods of FIG. 1 or 4.
Figure 2B:
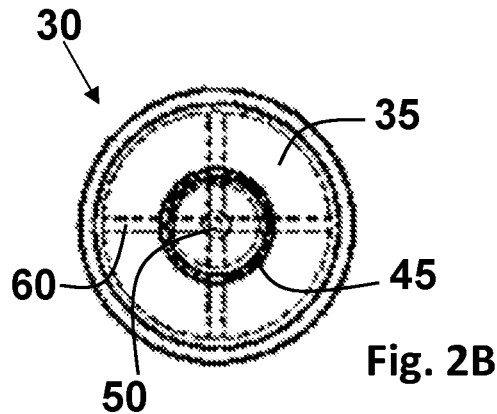
FIG. 2B is a perspective orthographic view of the siphon delivery crucible of FIG. 2A.
Figure 2C:
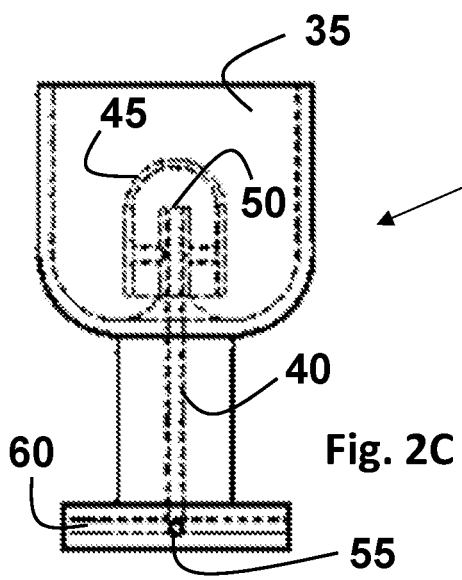
FIGS. 2C and 2D are cross-sectional orthographic views of the siphon delivery crucible of FIGS. 2A and 2B.
Figure 2D:
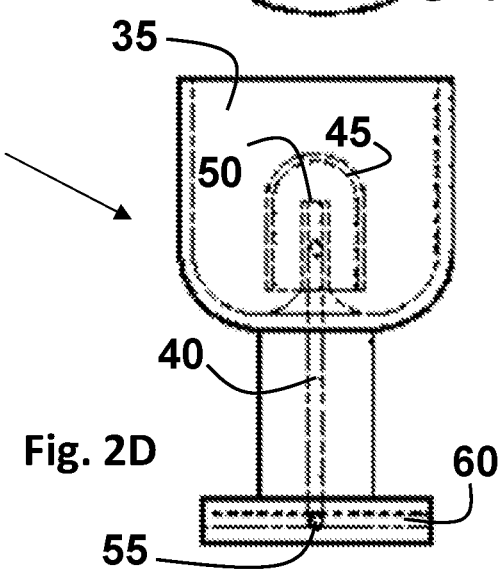

The drawings described herein are for illustration purposes only and are not intended to limit the scope of the present disclosure in any way.

DETAILED DESCRIPTION

The following description is merely exemplary in nature and is in no way intended to limit the present disclosure or the application or use thereof. For example, the method of delivering a flowable material to a preformed component according to the teachings contained herein is described throughout the present disclosure in conjunction with infiltrating a preformed component, such as a ceramic matrix composite (CMC), using a specific crucible configuration in order to more fully illustrate the composition and the use thereof. However, the incorporation and use of such a method of delivering a flowable material to a preformed component using other crucible designs that also create a siphon is contemplated to be within the scope of the present disclosure. One skilled in the art will further understand that the creation of a siphon to deliver a flowable material to a preformed component, e.g., a CMC by directional infiltration, may also be used in applications, such as casting, for example, in which a molten metal or metal alloy is delivered into a mold to form a cast component without exceeding the scope of the present disclosure. It should be understood that throughout the description, corresponding reference numerals indicate like or corresponding parts and features.

A ceramic matrix composite (CMC) generally is made from a lay-up of a plurality of continuous ceramic fibers, formed to a desired shape. At this stage in the production of a CMC component, the lay-up is generally known as a ceramic fiber preform, fiber preform, or preform. The fiber preform, which may be partially-rigid or non-rigid, may be constructed in any number of different configurations. For example, the preform may be made of filament windings, braiding, and/or knotting of fibers, and may include two-dimensional and three-dimensional fabrics, unidirectional fabrics, and/or nonwoven textiles. The fibers used in the preform, furthermore, may comprise any number of different materials capable of withstanding the high processing temperatures used in preparing and operating the CMC, such as, but not limited to, carbon fibers, ceramic fibers (e.g., silicon carbide, alumina, mullite, zirconia, or silicon nitride), which can be crystalline or amorphous. The ceramic fibers may be suitably coated by various methods.

During preparation of the ceramic matrix composite (CMC), the preform, optionally or when desirable, may be infiltrated with a matrix precursor material to form a green body. The matrix precursor material can comprise any number of materials such as, but not limited to, polymers, metals, and ceramics, including without limitation silicon, silicon carbide, alumina, mullite, zirconia, and combinations thereof (e.g., silicon/silicon carbide, etc.). Alternatively, the matrix precursor material comprises ceramic particles. The fiber preform may be infiltrated with the matrix precursor material using any number of processes, for example by infiltration of the preform with a slurry of the matrix precursor material under elevated or reduced pressure, by chemical vapor deposition or chemical vapor infiltration, by pyrolysis (e.g., of a pre-ceramic polymer), by chemical reactions, sintering, melt infiltration, and electrophoretic deposition (e.g., of a ceramic powder). When desirable, the green body may be machined, if necessary to bring the geometry of the part into the required specifications.

Finally, the preform or green body is subjected to melt infiltration to form a ceramic matrix composite (CMC). Melt infiltration is a process in which a molten metal or metal alloy is infiltrated into any porosity present in the fiber preform or that remains in the green body. This molten metal or metal alloy occupies any interstices that exist between the ceramic fibers in the preformed component or between the solid ceramic matrix precursor material or fillers and the ceramic fibers in the green body thereby, creating a fully densified ceramic matrix composite (CMC). The molten metal or metal alloy infiltrates throughout the porous preform or green body by capillary pressure.

The present disclosure generally provides a method of delivering a flowable material, such as a molten metal or metal alloy, into a mold to form a cast component or to a preformed component. Referring to FIG. 1, this method 1 generally starts by providing 5 a crucible having a body configured as a reservoir to hold a flowable material, such as a molten metal or metal alloy. A metal, a metal alloy, or combination thereof is added 10 into the body of the crucible. This metal or metal alloy is a solid, such as a powder or particles, which exhibits a predetermined melting point. The crucible is heated 15 to a temperature that is at or above the melting point of the metal or metal alloy. The metal or metal alloy is allowed 20 to melt to form the flowable material. Finally, a siphon is created 25 such that the molten metal or metal alloy flows from the body of the crucible to fill a mold to form a cast component or to infiltrate the preformed component.

The creation of a siphon overcomes multiple technical challenges associated with the melt infiltration of a metal or metal alloy into a preformed component, such as a fiber preform or a green body used to form a ceramic matrix composite (CMC), or to filling a mold during the formation of a cast component. For example, the use of a siphon according to the teachings of the present disclosure ensures total delivery of the molten metal or metal alloy to mold or to the preformed component during infiltration. The creation and use of a siphon also ensures that the filling of the mold or the infiltration of the preformed component occurs only after the entire amount or all of metal or metal alloy that is to be delivered has melted. Metal alloys do not usually melt congruently and therefore this method ensures delivery only after complete melting of the alloy. The creation and use of a siphon also ensures the delivery of the molten metal or metal alloy at a material specific temperature predetermined by the metal or metal alloy composition. Finally, the method of the present disclosure provides for a variable head pressure during the filling of the mold or the infiltration of the preformed component through the tailoring of the geometry associated with the crucible and the associated runner system.

The use of a crucible that is configured or designed for siphon delivery offers distinct advantages over conventional delivery methods. For example, the siphon delivery mechanism includes no moving parts with the mold filling or component infiltration process being initiated immediately after all of the metal has melted, thereby, ensuring that the molten metal or metal alloy is more thoroughly homogenized compositionally as compared to the melt used for static infiltration. In addition, the filling of the mold or the infiltration of the preformed component may be carried out with a variable head pressure behind the incoming molten metal or metal alloy. The use of a siphon delivery method also ensures that the entire amount of the molten metal or metal alloy is delivered to the preformed component or to the mold, whereas with static infiltration it is often encountered that a portion of the molten metal or metal alloy does not make it to the preformed component or the mold.

The use of the siphon delivery method as described herein minimizes the creation of waste by delivering a precise amount of molten metal or metal alloy to the mold or to the preformed component. The minimization of waste is particularly advantageous when compared to dynamic infiltration, which requires large molten baths to dunk a green body into, thereby, creating a large amount of waste or an additional process step in in order to recycle any unused metal or metal alloy. The siphon delivery method allows a sprue in fluid communication with a runner system to be designed that can infiltrate a component (e.g., green body) or fill a mold from one or more precise location(s) in the geometry of the component via directional infiltration, thereby, ensuring total infiltration of the preformed component or the filling of the mold.

The temperature at which the molten metal or metal alloy is allowed to infiltrate the green body or fill the mold can be easily tailored to the precise point where the composition melts. The ability to precisely control the temperature avoids potential superheating of the molten metal or metal alloy. If or when superheating is desired, the fluid level in the cup may be artificially raised to begin the siphon mechanism using a submergible ram. Due to the operating principle being a siphon, the siphon delivery method works equally well under a vacuum or atmospheric pressure.

Siphon delivery refers to the movement through a tube of a flowable material, such as a molten metal, metal alloy, or combination thereof. The flowable material flows upward, above the surface of a reservoir, powered by the fall of the flowable material as it flows down a tube under the pull of gravity with subsequent discharge at a level lower than the surface of the reservoir from which it came. Although not wanting to be held by theory, there are several possible theories relative to how such a siphon delivery functions. One of these theories, describes the force of gravity pulling the flowable material down on the exit side of the tube or sprue, thereby, resulting in a reduced pressure at the entrance at the top of the tube or sprue. Thus, according to this theory, atmospheric pressure pushes the flowable material from the upper reservoir, up into the reduced pressure at the top of the sprue, and over into the downward facing tube. Another theory used to describe the siphon delivery mechanism is based on the cohesion tension that exists within the flowable material. This theory is used to explain the operation of siphon delivery in the presence of a vacuum.

Referring now to FIGS. 2A-2D, one example of a crucible 30 designed to implement the siphon delivery method of the present disclosure is described. This crucible comprises a body 35 configured as a reservoir to hold a flowable material, including without limitation, a molten metal or metal alloy. The crucible 30 further comprises a center sprue 30 having a first end 50 and a second end 55. The first end 50 has an opening that is elevated above the bottom of the body 35 and located beneath a dome 45. The second end 55 of the center sprue 30 is coupled to a runner system 60 through which the flowable material is delivered to the preformed component (e.g., green body) or to the mold. The runner system 60 is configured such that the molten metal or metal alloy infiltrates the component or fills the mold in one or more predetermined locations selected in order to minimize the trapping of gases in the preformed component or in the cast component.

Figure 3:
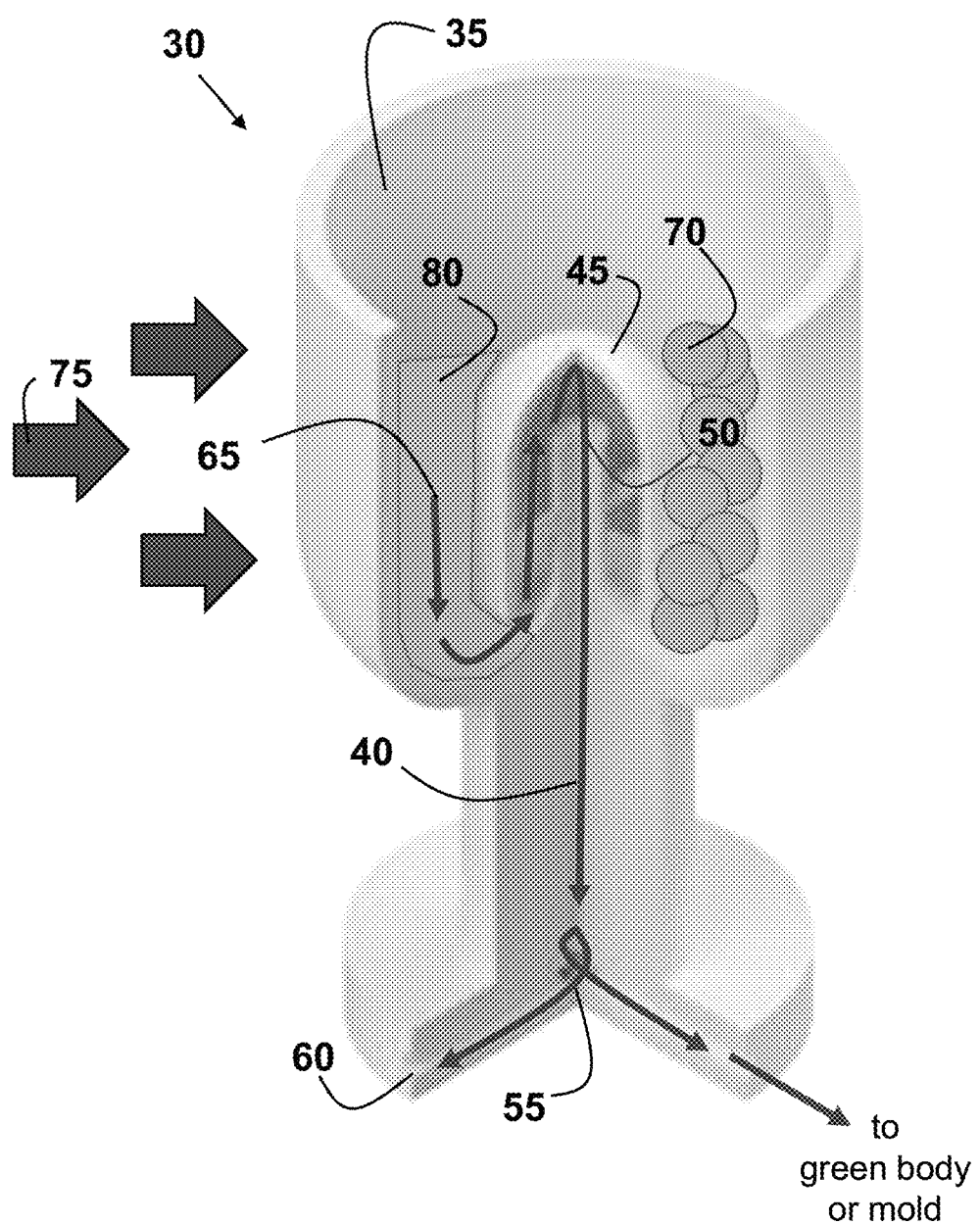
FIG. 3 is a three-quarter sectional view of a siphon delivery crucible used according to one aspect of the present disclosure.

As shown in FIG. 3, during operation a flowable material 70, such as a metal or metal alloy, in a solid form, including but not limited to a powder or solid particles, is placed within the body 35 of the crucible 30. The crucible is then heated 75 by any means known in the art, including without limitation, placing the crucible in a furnace, in order to melt the metal or metal alloy, e.g., the flowable material 80. Once the flowable material 80 is fully melted or formed in the body 35 of the crucible 30, the molten metal or metal alloy 80 will cover the dome 45 shaped portion in the center of the crucible 30. During this process, the flowable material (e.g., molten metal or alloy) will flow 65 under and fill up the interior region of the dome 45 and enter the center sprue 40 through the first end 50 or opening in the center sprue 40 and then flow downward through the center sprue 40. As the flowable material or molten metal and/or metal alloy 80 flows down the center sprue 40, a siphon is created, thus emptying the entirety of the flowable material 80 from the crucible 30 quickly and reliably. The flowable material 80 exits the center sprue 40 through the second end 55 or opening into a runner system 60 configured to deliver the flowable material 80 to the preformed component or the mold. The pathway taken by the flowable material 80 through the crucible 30 is shown by the arrows highlighting the flowing 65 of the molten metal or metal alloy 80.

One or more runners that form the runner system 60 may be attached to the center sprue 40 of the crucible 30 in order to deliver the flowable material 80 to the preformed component (e.g., green body) to be infiltrated or to fill the mold. The design of the runner system 60 can be created in such a way that the preformed component is infiltrated and/or the mold is filled from the top, at least one side, or the bottom in order to minimize the trapping of gases in the preformed component or the mold. The application of the molten metal or metal alloy 80 to the preformed component in this process may be described as directional infiltration. During the use of such directional infiltration the incoming molten metal or metal alloy will displace gas and reduce traditional complications of trapped gas often seen during traditional static melt infiltration.

The crucible may be formed from a metallic or ceramic material capable of being exposed to the heating in a furnace or other means necessary to melt the metal or metal alloy used to form the flowable material with the occurrence of either little or substantially no deformation. Thus, the melting point of the metallic or ceramic material used to form the crucible is higher than the melting point of the metal or metal alloy used to form the flowable material. Alternatively, the metallic or ceramic material used to form the crucible is capable of being exposed to a temperature that is at least 75° C.; alternatively, at least 100° C.; alternatively, greater than 200° C.; alternatively, 250° C. or greater than the melting point of the metal or metal alloy used form the flowable material.

Figure 4:
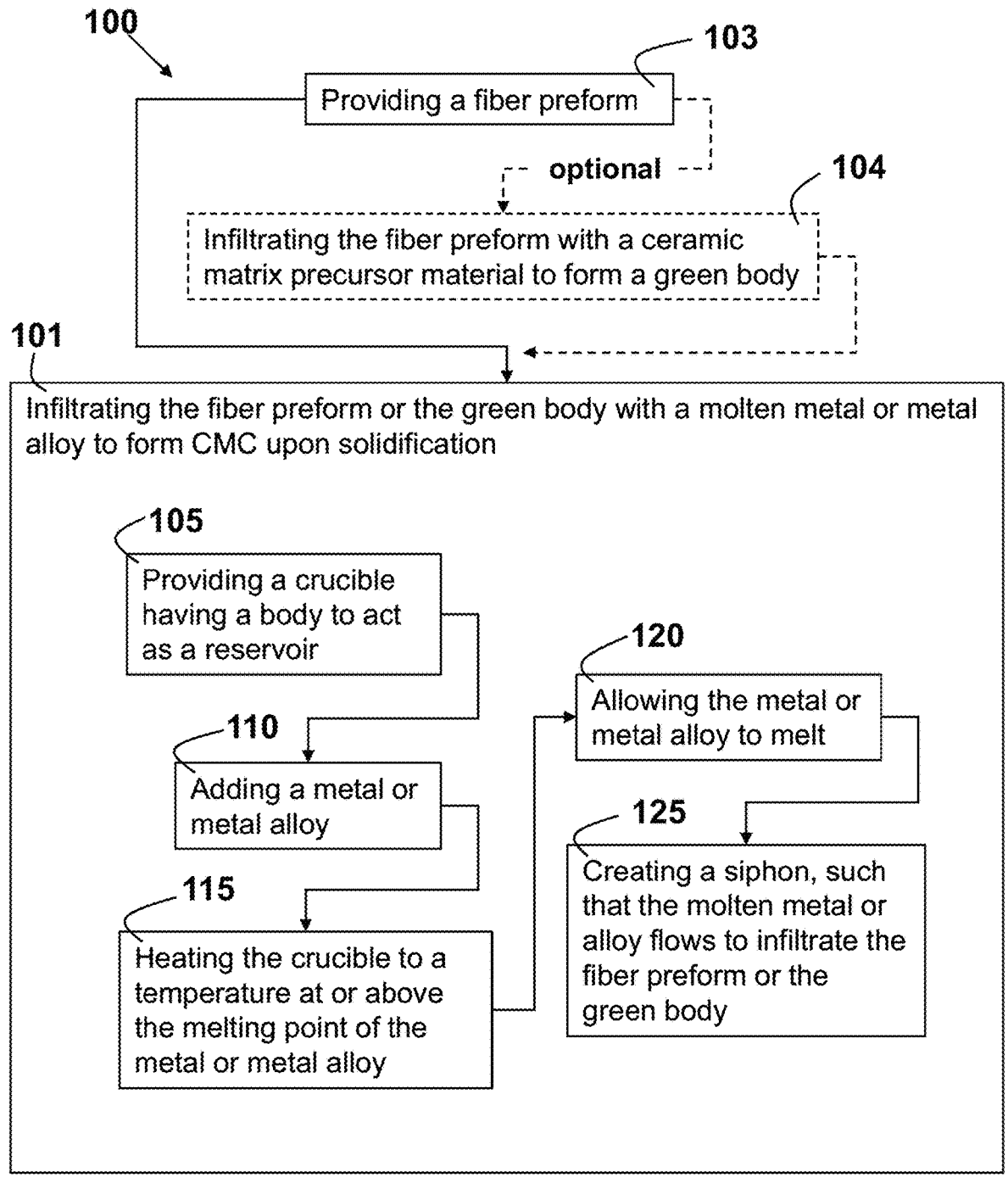
FIG. 4 is a flowchart of a process for forming a CMC according to the teachings of the present disclosure.

Referring now to FIG. 4, according to another aspect of the present disclosure, a method 100 of preparing a ceramic matrix composite (CMC) is further described. This method generally comprises, consists of, or consists essentially of the following steps. A fiber preform as previously described above and conventionally known is provided 103. This fiber preform may comprise a plurality of fibers, wherein the preform is shaped such that it resembles the final configuration desired for the ceramic matrix composite (CMC). Optionally, a ceramic matrix precursor material may be infiltrated 104 into the fiber preform to form a green body. Then a molten metal or metal alloy may infiltrate 101 the fiber preform or green body. The metal or alloy that infiltrates the fiber preform or green body is allowed to solidify, thereby, forming the ceramic matrix composite (CMC). The step of infiltrating 101 the fiber preform or green body involves the use of the method of delivering a flowable material to a preformed component as previously described above and in FIG. 1. When desirable, one or more finishing operations may be performed on the CMC. These finishing operations may include, but not be limited to, grinding, sanding, cutting, trimming, densification, brazing, or surface treatment, to name a few.

The fiber preform or preformed component that is provided may comprise a plurality of fibers that are made from any inorganic material stable at processing temperatures above about 1,000° C. and compatible with the temperature of the molten metal or alloy used to infiltrate the pores or free volume in the fiber preform. The plurality of fibers may be woven into a shape that resembles the ceramic matrix composite (CMC) to be produced. Several specific examples of fibers include, without limitation, silicon carbide (SiC) fibers, silicon nitride fibers, alumina fibers, mullite fibers, zirconia fibers, carbon or graphite fibers, or a combination thereof. Alternatively, the fiber preform comprises fibers selected from the group of silicon carbide, silicon nitride, silicon oxynitride, silicon oxycarbide, silicon carbonitride, silicon oxycarbonitride, or mixtures thereof. Alternatively, the fibers are SiC fibers, such as those commercially available under the designation HI-NICALON® fibers and SYL-RAMIC® fibers (both of which are registered trademarks of Col Ceramics, Inc., San Diego, Calif.). The ceramic fibers may include chopped fibers, continuous fibers, woven fabrics or combinations thereof that are laid up, fixed, and shaped into the configuration of a desired component.

When desirable, the fiber preform may further comprise other additives or processing aids. For example, the inorganic fibers in the preform may be treated by applying a coating or coatings to provide a compliant layer at the interface between the fibers and the matrix material composed of subsequently introduced particles or components of the molten metal or alloy infiltrant. This compliant layer may enhance the toughness of and crack deflection in the final ceramic matrix composite (CMC) and/or to prevent reaction of the reinforcing fibers with the molten metal or alloy infiltrant. Suitable coatings include, but are not limited to, carbon, aluminum nitride, boron nitride, silicon nitride, silicon carbide, boron carbide, metal borides, transition metal silicides, transition metal oxides, transition metal silicates, rare earth metal silicates and mixtures and combinations thereof. If used, in various embodiments the fiber coating may have a thickness of about 0.05 micrometers (μm) to 15 mm, alternatively, about 0.1 μm to about 5 μm.

The ceramic fibers in the preform may include individual fiber filaments or a bundle and/or a tow of filaments. The filaments in each bundle or tow may be braided or otherwise arranged. Each of the fibers is individually selected and may be of the same or different composition and/or diameter. Alternatively, the fibers are the same in at least one of said composition and/or diameter. The ceramic fiber filaments may have a diameter that is between about 1 micrometer (μm) to about 50 μm; alternatively, about 5 μm to about 30 μm; alternatively, about 10 μm to about 20 μm.

As used herein the term "ceramic matrix precursor" is intended to refer to the main slurry used to form the bulk of the matrix between fibers. The ceramic matrix precursor may comprise any number of materials such as, but not limited to, polymers and ceramic particles in combination with or without the presence of a metal. Several specific examples of ceramics that may be used include, without limitation, carbon, silicon, silicon carbide, alumina, mullite, zirconia, and combinations thereof. Several specific examples of metals that may be used in combination with the ceramic particles include, without limitation, aluminum, silicon, nickel, titanium, or mixtures and alloys thereof. Alternatively, the ceramic matrix precursor is a combination of carbon, silicon, and silicon carbide (e.g., silicon/silicon carbide). When desirable, the ceramic matrix precursor may be combined with other additives or process aids For the purpose of this disclosure the molten metal or metal alloy used as the flowable material to fill the mold to form a cast component or to infiltrate the preformed component, the fiber preform or the green body may comprise any known metal or metal alloy known in the art to be used in such an application. Several specific examples of metals that may be used include, without limitation, aluminum, silicon, nickel, titanium, or mixtures and alloys thereof. Alternatively, the metal or metal alloy is silicon or a silicon alloy.

Any heat source may be used that is capable of sufficiently heating the crucible to a predetermined target temperature. The heat source may include but not be limited to a furnace. The heating of the crucible and the infiltration process can optionally be carried out under atmospheric pressure or under full vacuum (e.g., about 1 Torr), but in other embodiments the infiltration may be carried out under partial vacuum (e.g., less than atmospheric pressure) or in an inert gas under atmospheric pressure to limit evaporation losses. The predetermined target temperature is about 20° C. to about 50° C. greater than the melting temperature of the metal or alloy; alternatively, at least 50° C. greater than the melting temperature of the metal or alloy; alternatively, between about 50° C. to about 100° C. above the melting point of the metal or alloy.

During melt infiltration a wavefront of the metal or alloy is established and advances through the structure of the fiber preform and occupies the free volume or interstices between the fibers until the preform is sufficiently densified. The preform is sufficiently densified when less than about 5%; alternatively, less than about 3%; alternatively less than about 1% porosity remains based on the overall porosity of the fiber preform. The final CMC includes no macroscopic porosity, which in this application means pores with an average pore size of less than about 200 μm, or less than about 50 μm, or less than about 2 μm, and includes a porosity of less than about 5%, or less than about 3%, or less than about 1% as previously described above.

The ceramic matrix composite (CMC) formed according to the method of the present disclosure may be shaped into a component for use in a variety of applications, including without limitation, applications in the aerospace and/or automotive industries. Ceramic matrix composites exhibit a combination of properties that make them applicable for use in a variety of industrial applications that demand excellent thermal and mechanical properties along with low weight, such as gas turbine engine components, for example.

For the purpose of this disclosure the terms "about" and "substantially" are used herein with respect to measurable values and ranges due to expected variations known to those skilled in the art (e.g., limitations and variability in measurements).

The recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

The terms "at least one" and "one or more of" an element are used interchangeably and may have the same meaning. These terms, which refer to the inclusion of a single element or a plurality of the elements, may also be represented by the suffix "(s)" at the end of the element. For example, "at least one fiber", "one or more fibers", and "fiber(s)" may be used interchangeably and are intended to have the same meaning.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The subject-matter of the disclosure may also relate, among others, to the following aspects:

A first aspect relates to a method for delivering a flowable material to a preformed component or into a mold to form a cast component, the method comprising: providing a crucible having a body configured as a reservoir to hold the flowable material; adding a metal, a metal alloy, or combination thereof into the body of the crucible, the metal or metal alloy having a predetermined melting point; heating the crucible with the metal or metal alloy contained therein to a temperature that is at or above the melting point of the metal or metal alloy; allowing the metal or metal alloy to melt to form the flowable material; creating a siphon such that the molten metal or metal alloy flows from the body of the crucible to infiltrate the preformed component or to fill the mold.

A second aspect relates to the method of the first aspect, wherein the molten metal or metal alloy begins to flow after all of the metal or metal alloy in the crucible has melted.

A third aspect relates to the method of the first or second aspects, wherein the siphon is in fluid communication with a runner system configured to deliver the molten metal or metal alloy to the mold or to the preformed component via directional infiltration.

A fourth aspect relates to the method of any preceding aspect, wherein the siphon provides a predetermined amount of molten metal or metal alloy to infiltrate the preformed component or to fill the mold.

A fifth aspect relates to the method of the third aspect, wherein the crucible comprises a center sprue having a first end and a second end; the first end having an opening that is elevated above the bottom of the body, the opening being located beneath a dome; the second end being coupled to the runner system.

A sixth aspect relates to the method of the third or fifth aspect, wherein the runner system is configured such that the molten metal or metal alloy infiltrates the component or fills the mold in one or more predetermined locations selected to minimize the trapping of gases in the preformed component or in the cast component.

A seventh aspect relates to the method of the sixth aspect, wherein the preformed component or the mold has a top, at least one side, and a bottom; wherein the molten metal or metal alloy infiltrates the preformed component or the mold from one or more of the top, the at least one side, or the bottom.

An eighth aspect relates to the method of any preceding aspect, wherein the siphon is created under a vacuum or atmospheric pressure.

A ninth aspect relates to the method of any preceding aspect, wherein the crucible is formed from a metallic or ceramic material that has a melting point that is higher than the melting point of the metal or metal alloy used to form the flowable material.

A tenth aspect relates to the method of any preceding aspect, wherein the metal or metal alloy is added to the crucible as a powder or solid particles.

An eleventh aspect relates to the method of any preceding aspect, wherein the metal or metal alloy is silicon or a silicon alloy.

A twelfth aspect relates to the method of any preceding aspect, wherein the preformed component is a fiber preform used to form a fiber reinforced ceramic matrix composite (CMC).

A thirteenth aspect relates to the method of the twelfth aspect, wherein the fiber preform comprises fibers selected from the group of silicon carbide, silicon nitride, silicon oxynitride, silicon oxycarbide, silicon carbonitride, silicon oxycarbonitride, or mixtures thereof.

A fourteenth aspect relates to the method of any preceding aspect, wherein the metal or metal alloy is heated by placing the crucible into a furnace.

A fifteenth aspect relates to a method of forming a ceramic matrix composite (CMC), the method comprising: providing a fiber preform; optionally, infiltrating the fiber preform with a ceramic matrix precursor material to form a green body; and infiltrating the fiber preform or the green body with a molten metal or metal alloy; and allowing the metal or alloy infiltrated in to the fiber preform or green body to solidify, thereby, forming the ceramic matrix composite (CMC); wherein the step of infiltrating the fiber preform or green body with the metal or metal alloy comprises: providing a crucible having a body configured as a reservoir to hold the molten metal or metal alloy; adding a metal, a metal alloy, or combination thereof into the body of the crucible, the metal or metal alloy having a predetermined melting point; heating the crucible with the metal or metal alloy contained therein to a temperature that is at or above the melting point of the metal or metal alloy; allowing the metal or metal alloy to melt to form the molten metal or metal alloy; and creating a siphon such that the molten metal or metal alloy flows from the body of the crucible to infiltrate the fiber preform or green body.

A sixteenth aspect relates to the method of the fifteenth aspect, wherein the siphon is in fluid communication with a runner system configured to deliver the molten metal or metal alloy to the fiber preform or green body via directional infiltration; wherein the runner system is configured such that the molten metal or metal alloy infiltrates the fiber preform or green body in one or more predetermined locations selected in order to minimize the trapping of gases in the fiber preform or the green body; wherein the fiber preform or green body has a top, at least one side, and a bottom; wherein the molten metal or metal alloy infiltrates the fiber preform or green body from one or more of the top, the at least one side, or the bottom.

A seventeenth aspect relates to the method of the fifteenth or sixteenth aspect, wherein the siphon provides a predetermined amount of molten metal or metal alloy to infiltrate the fiber preform or green body.

An eighteenth aspect relates to the method of any of the fifteenth through the seventeenth aspects, wherein the crucible comprises a center sprue having a first end and a second end; the first end having an opening that is elevated above the bottom of the body, the opening being located beneath a dome; the second end being coupled to the runner system.

A nineteenth aspect relates to the method of any of the fifteenth through the eighteenth aspects, wherein the siphon is created under a vacuum or atmospheric pressure.

A twentieth aspect relates to the method of any of the fifteenth through the nineteenth aspects, wherein the metal or metal alloy is silicon or a silicon alloy; wherein the fiber preform comprises fibers selected from the group of silicon carbide, silicon nitride, silicon oxynitride, silicon oxycarbide, silicon carbonitride, silicon oxycarbonitride, or mixtures thereof; and optionally, wherein the ceramic matrix precursor material comprises a slurry formed of particles selected from the group of silicon, silicon carbide, alumina, mullite, zirconia, and combinations thereof.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for delivering a flowable material to a preformed component or into a mold to form a cast component, the method comprising:
    providing a crucible having a body configured as a reservoir to hold the flowable material;
    adding a metal or metal alloy into the body of the crucible, the metal or metal alloy having a predetermined melting point;
    heating the crucible with the metal or metal alloy contained therein to a temperature that is at or above the melting point of the metal or metal alloy;
    allowing the metal or metal alloy to melt to form the flowable material comprising a molten metal or alloy;
    creating a siphon such that the molten metal or metal alloy flows from the body of the crucible to infiltrate the preformed component or to fill the mold, the siphon being created under vacuum or atmospheric pressure.

2. The method according to claim 1, wherein the molten metal or metal alloy begins to flow after all of the metal or metal alloy in the crucible has melted.

3. The method according to claim 1, wherein the siphon is in fluid communication with a runner system configured to deliver the molten metal or metal alloy to the mold or to the preformed component via directional infiltration.

4. The method according to claim 3, wherein the crucible comprises a center sprue having a first end and a second end; the first end having an opening that is elevated above a bottom of the body, the opening being located beneath a dome; the second end being coupled to the runner system.

5. The method according to claim 4, wherein, as the metal or metal alloy melts to form the flowable material, the dome is covered with the molten metal or alloy.

6. The method according to claim 3, wherein the runner system is configured such that the molten metal or metal alloy infiltrates the component or fills the mold in one or more predetermined locations selected to minimize the trapping of gases in the preformed component or in the cast component.

7. The method according to claim 6, wherein the preformed component or the mold has a top, at least one side, and a bottom; wherein the molten metal or metal alloy infiltrates the preformed component or the mold from one or more of the top, the at least one side, or the bottom.

8. The method according to claim 1, wherein the siphon provides a predetermined amount of the molten metal or metal alloy to infiltrate the preformed component or to fill the mold.

9. The method according to claim 1, wherein the crucible is formed from a metallic or ceramic material that has a melting point that is higher than the melting point of the metal or metal alloy used to form the flowable material.

10. The method according to claim 1, wherein the metal or metal alloy is added to the crucible as a powder or solid particles.

11. The method according to claim 1, wherein the metal or metal alloy is silicon or a silicon alloy.

12. The method according to claim 1, wherein the preformed component is a fiber preform used to form a fiber reinforced ceramic matrix composite (CMC).

13. The method according to claim 12, wherein the fiber preform comprises fibers selected from the group of silicon carbide, silicon nitride, silicon oxynitride, silicon oxycarbide, silicon carbonitride, silicon oxycarbonitride, or mixtures thereof.

14. The method according to claim 1, wherein the metal or metal alloy is heated by placing the crucible into a furnace.

15. A method of forming a ceramic matrix composite (CMC), the method comprising:
providing a green body;
infiltrating the green body with a molten metal or metal alloy; and
allowing the molten metal or alloy infiltrated into the green body to solidify, thereby, forming the ceramic matrix composite (CMC);
wherein the step of infiltrating the green body with the molten metal or metal alloy comprises:
providing a crucible having a body configured as a reservoir to hold the molten metal or metal alloy;
adding a metal or a metal alloy into the body of the crucible, the metal or metal alloy having a predetermined melting point;
heating the crucible with the metal or metal alloy contained therein to a temperature that is at or above the melting point of the metal or metal alloy;
allowing the metal or metal alloy to melt to form the molten metal or metal alloy; and
creating a siphon such that the molten metal or metal alloy flows from the body of the crucible to infiltrate the green body, the siphon being created under a vacuum or atmospheric pressure.

16. The method according to claim 15, wherein the siphon is in fluid communication with a runner system configured to deliver the molten metal or metal alloy to the green body via directional infiltration;
wherein the runner system is configured such that the molten metal or metal alloy infiltrates the green body in one or more predetermined locations selected in order to minimize the trapping of gases in the green body;
wherein the green body has a top, at least one side, and a bottom; wherein the molten metal or metal alloy infiltrates the green body from one or more of the top, the at least one side, or the bottom.

17. The method according to claim 15, wherein the siphon provides a predetermined amount of the molten metal or metal alloy to infiltrate the green body.

18. The method according to claim 15, wherein the crucible comprises a center sprue having a first end and a second end; the first end having an opening that is elevated above a bottom of the body, the opening being located beneath a dome; the second end being coupled to the runner system.

19. The method according to claim 18, wherein, as the metal or metal alloy melts to form the flowable material, the dome is covered with the molten metal or alloy.

20. The method according to claim 15, wherein the metal or metal alloy is silicon or a silicon alloy;
wherein providing the green body comprises infiltrating a fiber preform with a ceramic matrix precursor material to form the green body,
wherein the fiber preform comprises fibers selected from the group of silicon carbide, silicon nitride, silicon oxynitride, silicon oxycarbide, silicon carbonitride, silicon oxycarbonitride, or mixtures thereof.

* * * * *